(12) United States Patent
Ziegler et al.

(10) Patent No.: US 12,110,095 B2
(45) Date of Patent: Oct. 8, 2024

(54) AERIAL DEVICE FOR A VEHICLE AND VEHICLE WITH AN AERIAL DEVICE

(71) Applicant: Airbus Defence and Space GmbH, Taufkirchen (DE)

(72) Inventors: Volker Ziegler, Taufkirchen (DE); Wolfgang Winkler, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 176 days.

(21) Appl. No.: 17/706,994

(22) Filed: Mar. 29, 2022

(65) Prior Publication Data

US 2022/0219801 A1 Jul. 14, 2022

Related U.S. Application Data

(63) Continuation of application No. PCT/EP2020/078759, filed on Oct. 13, 2020.

(30) Foreign Application Priority Data

Oct. 14, 2019 (DE) ...................... 10 2019 215 718.1

(51) Int. Cl.
*H01Q 1/28* (2006.01)
*B64C 1/36* (2006.01)
(Continued)

(52) U.S. Cl.
CPC .............. *B64C 1/36* (2013.01); *H01Q 1/282* (2013.01); *H01Q 15/08* (2013.01); *H01Q 19/06* (2013.01); *H01Q 23/00* (2013.01)

(58) Field of Classification Search
CPC H01Q 1/282; H01Q 1/40; H01Q 1/42; H01Q 15/08; H01Q 19/06; H01Q 23/00
See application file for complete search history.

(56) References Cited

U.S. PATENT DOCUMENTS 4,878,062 A 10/1989 Craven et al.
5,955,752 A * 9/1999 Fukaya ..................... H01Q 1/42
257/664

(Continued)

FOREIGN PATENT DOCUMENTS

CN 109103604 A * 12/2018 ............. H01Q 15/08
DE 10 2011 076501 A1 11/2012
(Continued)

OTHER PUBLICATIONS

"IEEE Standard for Definitions of Terms for Antennas," in IEEE Std 145-2013 (Revision of IEEE Std 145-1993), vol. no., pp. 1-50, Mar. 6, 2014, doi: 10.1109/IEEESTD.2014.6758443. (Year: 2014).*

(Continued)

*Primary Examiner* — Ab Salam Alkassim, Jr.
*Assistant Examiner* — Leah Rosenberg
(74) *Attorney, Agent, or Firm* — KDW Firm PLLC

(57) ABSTRACT

An aerial device for a vehicle, particularly an aircraft, includes an aerial arrangement and a lens, which includes a first lens area, made of a first material with a first dielectric constant, overlapping the aerial arrangement and a second lens area, made of a second material with a second dielectric constant, overlapping the first lens area, with the second dielectric constant being smaller than the first dielectric constant, and wherein the second lens area extends in a longitudinal direction and in a curve in respect of a vertical direction oriented transverse to the longitudinal direction.

20 Claims, 2 Drawing Sheets

(51) Int. Cl.
*H01Q 15/08* (2006.01)
*H01Q 19/06* (2006.01)
*H01Q 23/00* (2006.01)

(56) References Cited

U.S. PATENT DOCUMENTS

| | | | | |
|---|---|---|---|---|
| 7,190,324 | B2* | 3/2007 | Henderson | H01Q 1/34 |
| | | | | 343/753 |
| 10,644,408 | B2* | 5/2020 | Sakai | H01Q 15/08 |
| 2002/0174685 | A1* | 11/2002 | Nonogaki | H01Q 19/06 |
| | | | | 264/1.32 |
| 2010/0038488 | A1* | 2/2010 | Ferguson | B64C 1/36 |
| | | | | 244/130 |
| 2015/0346334 | A1* | 12/2015 | Nagaishi | H01Q 1/38 |
| | | | | 342/115 |
| 2020/0350681 | A1* | 11/2020 | Scarborough | H01Q 3/04 |

FOREIGN PATENT DOCUMENTS

| | | | | |
|---|---|---|---|---|
| DE | 11 2013 05877 T5 | 8/2015 | | |
| FR | 3030903 A1 * | 6/2016 | ........... | H01Q 1/2283 |
| JP | H09181523 A | 7/1997 | | |
| JP | 2007241951 A | 9/2007 | | |
| WO | WO 98/54788 A1 | 12/1998 | | |
| WO | WO 2004/088793 A1 | 10/2004 | | |

OTHER PUBLICATIONS

International Search Report and Written Opinion for Application No. PCT/EP2020/078759 dated Dec. 1, 2020.

* cited by examiner

AERIAL DEVICE FOR A VEHICLE AND VEHICLE WITH AN AERIAL DEVICE

CROSS-REFERENCE TO RELATED APPLICATIONS

This application is a continuation of and claims priority to Patent Application No. PCT/EP2020/078759 filed Oct. 13, 2020, which claims priority to German Patent Application No. 10 2019 215 718.1, filed Oct. 14, 2019, the entire disclosures of which are incorporated by reference herein.

TECHNICAL FIELD

The disclosure herein relates to an aerial device for a vehicle, in particular for an aircraft, and to a vehicle, in particular an aircraft, having such an aerial device.

BACKGROUND

Aircraft, and to an increasing degree also other vehicles or mobile platforms such as automobiles, trucks, buses, trains, ships, etc., comprise radar systems and/or mobile communication systems. These systems require aerials, which are typically mounted on an outer skin of the vehicle. In order to protect the aerial and to keep the aerodynamic effects of the aerial as small as possible, a fairing which encloses the aerial over an external surface section of the outer skin is generally used.

Against this background, for example, U.S. Pat. No. 7,967,253 B2 describes a covering for a radar aerial of an aircraft, the covering having a shape which is optimized in respect of aerodynamic properties.

SUMMARY

It is an object of the disclosure herein to provide improved solutions for aerials on mobile platforms, in particular on aircraft.

This object is respectively achieved by the subject matter disclosed herein.

According to a first aspect of the disclosure herein, an aerial device for a vehicle, in particular for an aircraft, for example an airplane or an unmanned drone, is provided. The aerial device according to the disclosure herein comprises an aerial arrangement and a lens, which comprises a first lens region covering the aerial arrangement and made of a first material having a first dielectric constant, and a second lens region covering the first lens region and made of a second material having a second dielectric constant. The second dielectric constant is lower than the first dielectric constant. Furthermore, the second lens region extends in the shape of an arc in a longitudinal direction and in relation to a height direction directed transversely with respect to the longitudinal direction.

According to a second aspect of the disclosure herein, a vehicle is provided, having an outer skin with an outer face which forms a flow surface, and having an aerial device according to the first aspect of the disclosure herein, which is connected to the outer skin, wherein the second lens region of the lens protrudes beyond the outer skin.

One underlying concept of the disclosure herein is to encapsulate an aerial of a radar system or communication system at least partially in a two-layer or multilayer lens which has an aerodynamically advantageous arc-shaped configuration, or the configuration of a narrow, elongated dome. The lens comprises a first lens part, or a first lens region, which has a high dielectric constant and therefore a high refractive index, and which is used to focus an electromagnetic beam emitted by the aerial, and a second lens part, or a second lens region, which has a low dielectric constant and therefore a low refractive index and which has an aerodynamically optimized shape. The first lens part covers the aerial arrangement fully and may have for example an approximately dome-shaped or vaulted-shaped configuration. The second lens part encloses the first lens part at least partially, is bonded preferably materially to the latter, and has an elongate arc-shaped configuration.

In the vehicle according to the disclosure herein, which may for example be an aircraft, the aerial device is connected to or fastened on the outer skin of the vehicle, the aerial device being aligned so that the second lens region is aligned along an intended flow direction along which a fluid flow preferably, or during intended use of the vehicle, flows over the outer skin.

By the two-layer lens structure with the first lens region, covering the aerial arrangement, for focusing the electromagnetic radiation and the second lens region, covering the first lens region, with the arc-shaped configuration, a particularly compact and aerodynamically advantageous structure of the aerial device is achieved. Since the second lens region covers, or at least partially encloses or encapsulates, the first lens region, the available space is employed optimally. It is furthermore advantageous that the second lens region is also formed by solid material, that is to say the material of the second lens region bears on the surface of the first lens region. In this way, the mechanical stability of the device is improved and the first lens region is protected even better against external effects.

Advantageous configurations and refinements are disclosed in the description and drawings.

According to one embodiment, the first dielectric constant may lie in a range of between 9 and 12, and the second dielectric constant may lie in a range of between 2.1 and 3. In this range of the first dielectric constant, efficient focusing of the electromagnetic radiation is achieved. The first lens region may therefore be configured even more compactly, and precisely directed emission is achieved. In the range of between 2.1 and 3 for the second dielectric constant, the effect of the second lens region on the emission is advantageously kept small. Optionally, the first lens region may be formed from silicon or aluminum nitride, for example with a dielectric constant of 12, and the second lens region may be formed from a plastic material.

According to a further embodiment, the first lens region and the second lens region may be produced in one piece, for example by a 3D printing method or an injection-molding method. According to one example production method for producing the aerial device, the first lens region may be constructed layer-by-layer on the aerial arrangement from the first material by an additive production method, for example by an FDM method, and the second lens region may be constructed layer-by-layer by the additive production method on the first lens region and around the first lens region. This results in a particularly efficient production method. Here, "FDM" stands as an abbreviation for the expression "Fused Deposition Modeling" and refers to a 3D printing method in which the component to be produced is constructed layer-by-layer by liquefying a meltable material in the form of a wire, applying the liquefied material by extrusion by a nozzle and subsequently solidifying the material by cooling at the desired position. By the one-piece configuration, the lens regions being materially bonded to one another, a particularly good mechanical connection is achieved between the lens regions. In particular, ingress of moisture, dirt or the like between the lens regions is prevented.

According to a further embodiment, the first lens region and the second lens region may be adhesively bonded to one another. In this way, a good mechanical connection is achieved between the lens regions, and ingress of moisture, dirt or the like between the lens regions is reliably prevented.

According to a further embodiment, the aerial arrangement may be integrated on a semiconductor device, which is fastened on a carrier plate. Particularly at high frequencies, a very compact structure of the aerial device may be achieved by integrating the aerial arrangement on a semiconductor device, for example on a semiconductor chip or a package of the semiconductor device, for example printing it thereon. The semiconductor device may be mounted on a carrier plate which in its turn provides a simple fastening structure for fastening on the outer skin of the vehicle and/or an electrical connection structure.

According to a further embodiment, a radar transceiver circuit may be integrated onto the semiconductor device, for example onto the semiconductor chip of the semiconductor device. Particularly in high frequency ranges, in particular at frequencies in the region of 100 GHz or more, this offers the advantage of a particularly compact structure and high performance.

According to a further embodiment, the aerial device may additionally comprise an electrical connection interface. The connection interface may for example be a connecting terminal, a solder position or a similar electrical connection.

According to a further embodiment, the aerial arrangement is formed as a radar aerial. This may also involve imaging types of radar, for example a MIMO radar or phased-array radar. For example, the connection interface may be formed for connecting the aerial arrangement to a radar transceiver. As an alternative, the radar transceiver circuit may, as already explained, be integrated onto the semiconductor chip of the semiconductor device.

According to a further embodiment, the aerial arrangement may be configured for operation at frequencies in a range of between 60 GHz and 300 GHz. In this frequency range, it is possible to produce particularly compactly constructed aerials which, for example, are integrated onto a semiconductor chip or a package of a semiconductor device, as described above. For example, the aerial arrangement may be configured for operation at frequencies in the 122-123 GHz frequency band.

According to one embodiment of the vehicle, the aerial device, in particular the carrier plate of the aerial device, may be arranged on the outer face. This offers the advantage that it is possible to provide only a small feed-through on the outer skin for connecting the aerial device.

According to a further embodiment of the vehicle, the outer skin may comprise a reception recess which extends between the outer face and an inner face placed opposite to the latter, the second lens region of the lens being arranged in the reception recess of the outer skin. Accordingly, the aerial device may be arranged below the outer skin and the second lens part, or the second lens region, fills a recess provided in the outer skin. In this way, the aerodynamic effect of the aerial device is reduced further.

According to a further embodiment, the vehicle may be an aircraft, for example an airplane or an unmanned drone. In the case of aircraft, the configuration of the aerial device is particularly advantageous because of the high flow speeds. In particular, the aerial device may be aligned with the longitudinal direction along a fuselage longitudinal direction of the aircraft.

In relation to direction specifications and axes, in particular direction specifications and axes which relate to the orientation of physical structures, an orientation of an axis, of a direction or of a structure "along" another axis, direction or structure is intended here to mean that these, in particular the tangents taken at a particular position of the structures, in each case extend at an angle of less than 45 degrees, preferably less than 30 degrees and particularly preferably parallel with respect to one another.

In relation to direction specifications and axes, in particular direction specifications and axes which relate to the orientation of physical structures, an orientation of an axis, of a direction or of a structure "transversely" with respect to another axis, direction or structure is intended here to mean that these, in particular the tangents taken at a particular position of the structures, in each case extend at an angle of greater than or equal to 45 degrees, preferably greater than or equal to 60 degrees and particularly preferably perpendicularly with respect to one another.

Here, component parts formed "in one piece", "in one part", "integrally" or "monobloc" generally mean that these component parts are present as a single part forming a material unit, and in particular are produced as such, one component part not being separable from the other component part without disrupting the material content of the other.

BRIEF DESCRIPTION OF THE DRAWINGS

The disclosure herein will be explained below with reference to the figures of the drawings. In the figures.

DETAILED DESCRIPTION

In the figures, references which are the same denote component parts which are the same or functionally the same, unless otherwise indicated.

Figure 1:
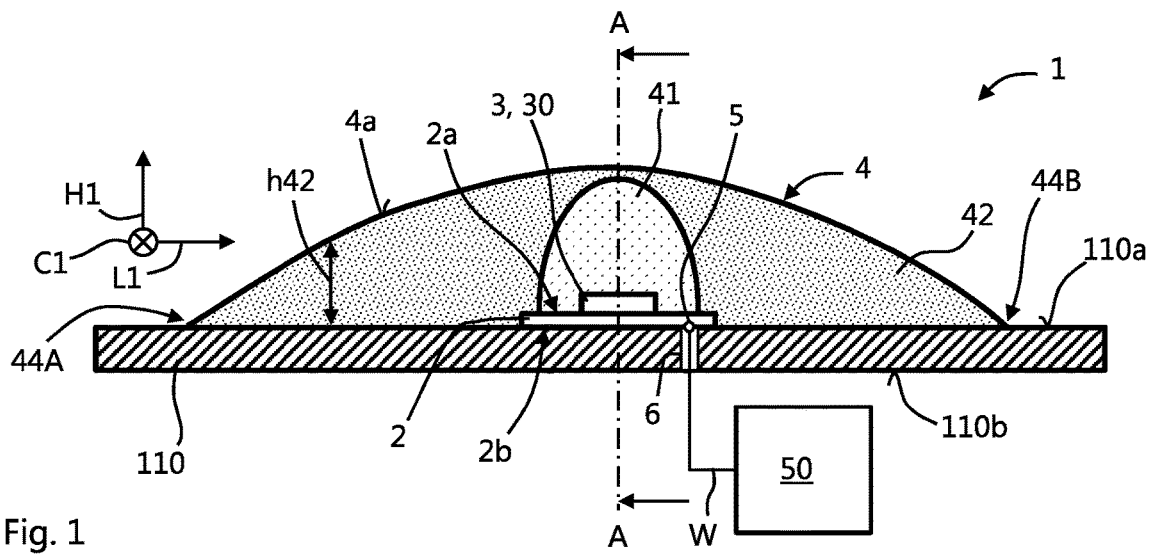
FIG. 1 shows a schematic sectional view of an aerial device according to one example embodiment of the disclosure herein.
Figure 2:
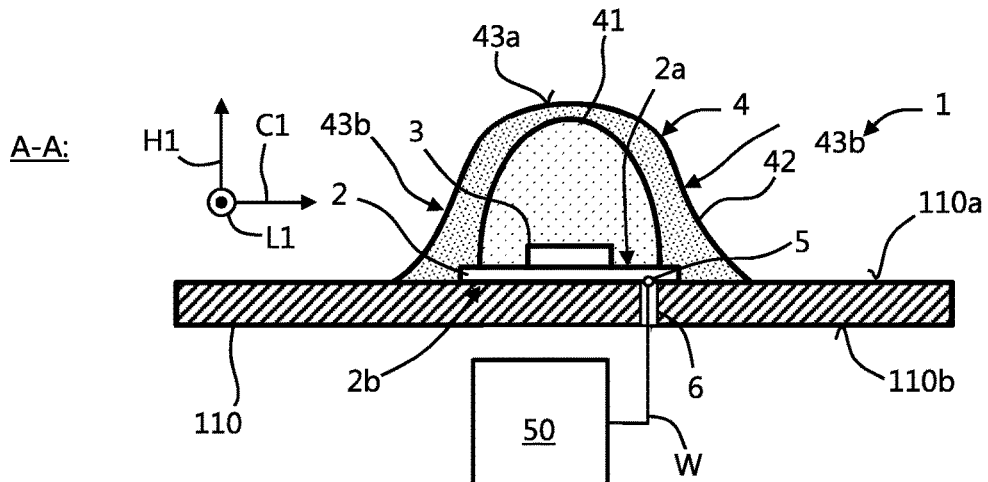
FIG. 2 shows a sectional view of the aerial device shown in FIG. 1, which is obtained with a section along the line A-A indicated in FIG. 1.
Figure 3:
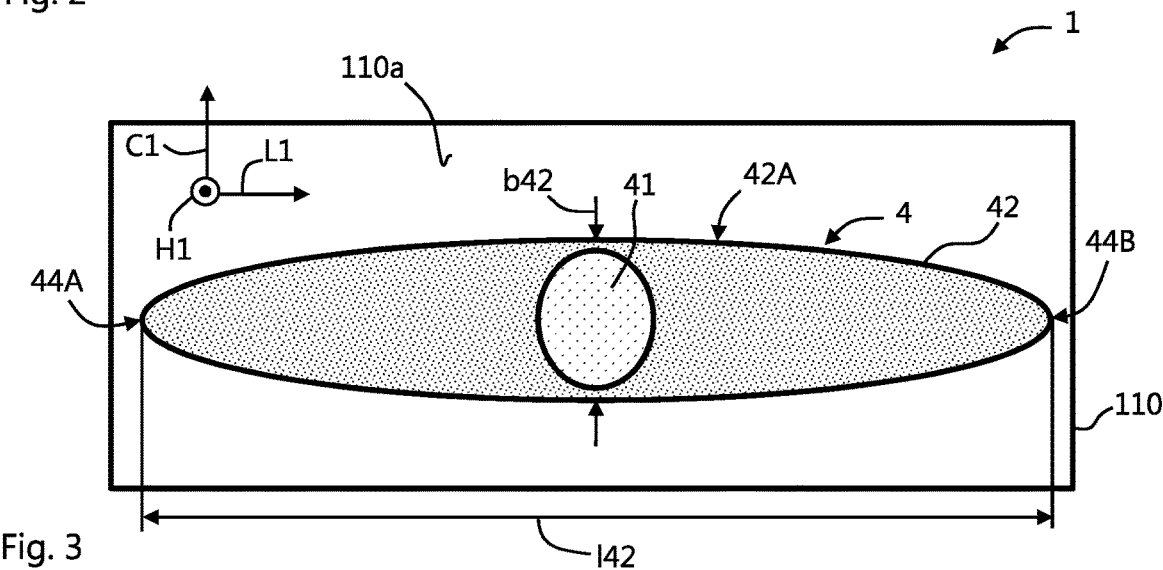
FIG. 3 shows a plan view of the aerial device shown in FIG. 1.

FIG. 1 schematically shows a sectional view of an aerial device 1 in a section along a longitudinal direction L1. FIG. 2 schematically shows a sectional view of the aerial device 1 shown in FIG. 1 with a section along a height direction H1 extending transversely, or perpendicularly, with respect to the longitudinal direction L1. FIG. 3 schematically shows a plan view of the aerial device 1 shown in FIGS. 1 and 2.

As may be seen particularly in FIG. 1, the aerial device 1 comprises an optional carrier plate 2, an aerial arrangement 3, a lens 4 and an optional connection interface 5. In FIGS. 1 to 3, the aerial device 1 is represented by way of example in a state in which it is mounted on an outer skin 110 of a vehicle 100.

The optional carrier plate 2 may in particular be a circuit board and is preferably formed from an electrically insulating plastic material.

The aerial arrangement 3 is represented in FIGS. 1 and 2 merely schematically as a block and can comprise a multiplicity of electrically conductive directional structures such as conductor tracks or the like, which are adapted to emit electromagnetic waves. The directional structures may for example be arranged in a planar, two-dimensional arrangement. As schematically represented in FIGS. 1 and 2, the aerial arrangement 3 may be integrated on a semiconductor device 30, for example in the form of printed conductor tracks or conductor tracks produced in another way on the semiconductor device 30. The semiconductor device 30 is represented in FIGS. 1 and 2 merely symbolically as a block. The semiconductor device 30 comprises in particular a semiconductor chip and a package. In general, the aerial arrangement 3 with its directional structures is integrated in the semiconductor device 30. Optionally, radar transceiver circuits may in addition also be integrated in the semiconductor device 30. For example, both the aerial arrangement 3 and the optional radar transceiver circuits may be formed on the chip of the semiconductor device 30. It is also conceivable for the chip to contain radar transceiver circuits and for the aerial arrangement 30 to be formed on the package of the semiconductor device 30. As an alternative, the aerial arrangement 3 may also be provided directly on the circuit board 2 and electrically connected by short connections to the chip which contains the radar transceiver circuits.

The semiconductor device 30 may in particular be fastened on the carrier plate 2, for example adhesively bonded or soldered thereto. Integration of the aerial arrangement 3 with the semiconductor device 30 is recommendable in particular for high frequencies, for example for frequencies in the range of between 60 GHz and 300 GHz. In general, the aerial arrangement 3 may be configured for operation at frequencies in a range of between 60 GHz and 300 GHz.

The optional connection interface 5 is likewise represented in FIGS. 1 and 2 merely symbolically as a circle and may for example be formed on the carrier plate 2 or on the semiconductor device 30. For example, the connection interface 5 may be produced as a connection terminal or as a solder position. In general, the connection interface 5 is formed as an electrical connection and is adapted to provide an electrical link to the aerial arrangement 5. FIGS. 1 and 2 schematically and purely by way of example represent a radar transceiver 50, which is adapted to generate radar waves and is electrically connected to the connection interface 5. The transceiver 50 may be part of the vehicle 100 or may form a radar system with the aerial device 1. As already explained above, the transceiver 50 may also be integrated as a circuit onto the chip of the semiconductor device 30.

As may be seen in FIGS. 1 through 3, the lens 4 comprises a first lens region 41 and a second lens region 42. The first lens region 41 may in particular have a dome-shaped or vaulted-shaped configuration, as is represented by way of example in FIGS. 1 and 2. The first lens region 41 covers the aerial arrangement 3 fully, and may in particular be arranged on a first surface 2a of the carrier plate 2 and optionally adhesively bonded thereto, as is represented by way of example in FIGS. 1 and 2. As may be seen in FIGS. 1 and 2, the aerial arrangement 3 is therefore encapsulated by the material of the first lens region 41 and by the carrier plate 2. It is also conceivable for the aerial arrangement 3 to be fully encapsulated by the material of the first lens region 41. The aerial arrangement 3 is therefore encapsulated at least by the material of the first lens region 41.

The first lens region 41 is used to focus the electromagnetic radiation that can be emitted by the aerial arrangement 3, and is formed from a first material which has a first dielectric constant, for example in a range of between 9 and 12. The first lens region 41 therefore has a high refractive index. For example, the first material may be a plastic material, in particular based on ABS (acrylonitrile butadiene styrene). Furthermore, for example, silicon or aluminum nitride may be envisioned as the first material.

As may be seen in FIGS. 1 and 3, the second lens region 42 extends along the longitudinal direction L1. As is schematically represented in FIG. 3, a base circumference 42A of the second lens region 42 may be configured approximately in a lens shape, or ovally. Other configurations may of course also be envisioned, for example a droplet shape. In relation to the height direction H1, the second lens region 42 has an arc-shaped profile, as is represented by way of example in FIG. 1. In this case, the height h42 of the second lens region 42 varies along the longitudinal direction L1, the height h42 having precisely one maximum between a front end 44A in relation to the longitudinal direction L1 and a rear end 44B in relation to the longitudinal direction L1 of the second lens region 42, as is schematically represented in FIG. 1. As may be seen in FIG. 2, the second lens region 42 can have a cross-sectional shape in relation to a transverse direction C1, which extends transversely, or perpendicularly, with respect to the height direction H1 and the longitudinal direction L1, which may be described illustratively as a bell curve. As is represented by way of example in FIG. 2, the second lens region 42 may have a convexly curved upper surface region 43a defining a maximum height in relation to the transverse direction C1 and two lateral surface regions 43b placed opposite to one another in relation to the transverse direction C1, which extend from the upper surface region 43a and are concavely curved. Other elongate arc-shaped configurations of the second lens section 42 may of course also be envisioned, the second lens section 42 having in relation to the longitudinal direction L1 a length l42 which is greater than a maximum width b42 of the second lens section 42 in relation to the transverse direction. For example, the maximum width b42 may be at least 5 percent and at most 50 percent of the length l42.

As may be seen particularly in FIGS. 1 and 2, the second lens region 42 covers the first lens region 41 fully. In particular, as is represented by way of example in FIGS. 1 and 2, the first lens region 41 may lie fully inside the cross section of the second lens region 42. Furthermore, the material of the second lens region 42 bears on the material of the first lens region 41 and is preferably materially bonded, for example adhesively bonded, thereto, or the first and the second lens region 41, 42 are produced in one piece with one another. In particular, a 3D printing method, for example an FDM method, may be used for one-piece production.

The second lens region 42 is used to mechanically protect the first lens region 41 and to form an aerodynamically favorable shape, or surface 4a, of the lens 4. The second lens region 42 is formed from a second material which has a second dielectric constant, for example in a range of between 2.1 and 3. The second lens region 42 therefore has a low refractive index. In general, the second dielectric constant is lower than the first dielectric constant. For example, the first material may be a plastic material, in particular based on ABS (acrylonitrile butadiene styrene).

Figure 4:
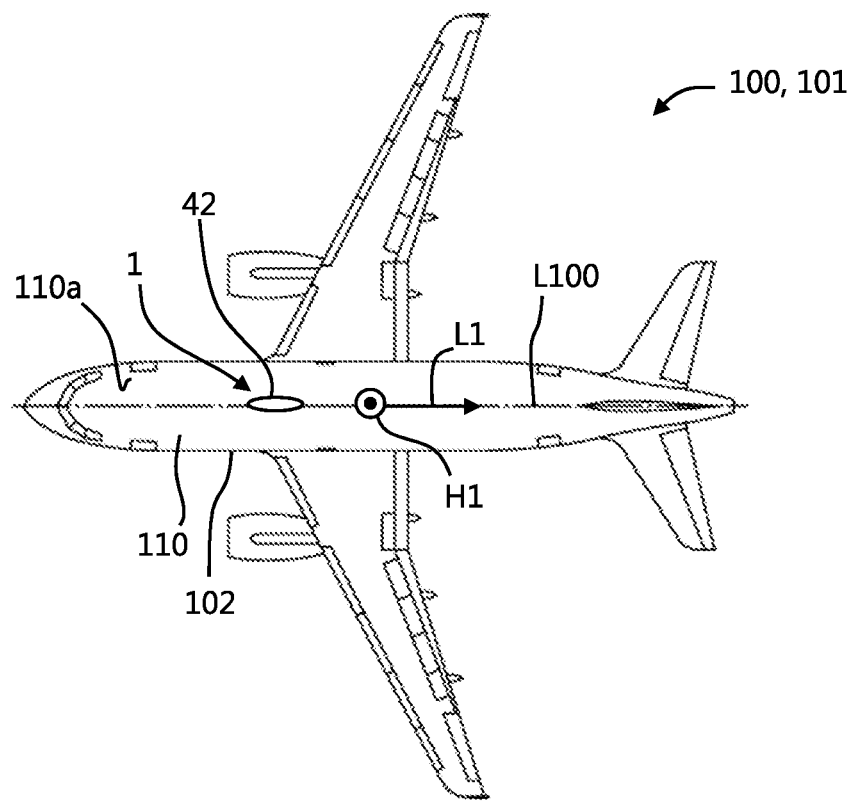
FIG. 4 shows a schematic plan view of a vehicle according to one example embodiment of the disclosure herein.

As already mentioned, the aerial device 1 is represented in FIGS. 1 to 3 by way of example arranged on an outer skin 110 of a vehicle 100. The vehicle 100 may in particular be an aircraft 101, for example an airplane, as is represented in FIG. 4. The aerial device 1 may of course also be employed on other vehicles 100, for example road vehicles, rail vehicles or ships.

The outer skin 110 of the vehicle 100 generally forms, with its outer face 110a, a surface of the vehicle 100 which is intended for a fluid, for example air, to flow around. The outer skin 110 furthermore has an inner face 110b, which is oriented oppositely to the outer face 110a and defines an inner side of the outer skin 110. The aerial device 1 is generally connected to the outer skin 110, the second lens region 42 of the lens 4 protruding beyond the outer skin 110, or the outer face 110a of the outer skin 110. In the case of the aircraft 101 represented by way of example in FIG. 4, the aerial device 1 is represented merely schematically. As may be seen in FIG. 4, the aerial device 1 can be arranged on an outer skin 110 of a fuselage 102 of the aircraft 101, extending in a fuselage longitudinal direction or fuselage longitudinal axis L100. In this case, the second lens region 42 may in particular extend with the longitudinal direction L1 along the fuselage longitudinal axis L100.

FIGS. 1 and 2 represent by way of example a possible arrangement or attachment of the aerial device 1 on the outer skin 110 of the vehicle 100. As may be seen in FIGS. 1 and 2, the aerial device 1 can be arranged on the outer face 110a of the outer skin 110. In particular, the optional carrier plate 2 can be arranged on the outer face 110a of the outer skin 110, while a second surface 2b placed opposite to the first surface 2a faces toward the outer face 110a and may be connected thereto, for example by adhesive bonding, screwing, riveting or in a similar way. In general, the aerial arrangement 3 can be arranged on an outer side of the outer skin 110, defined by the outer face 110a. The second lens region 42 may in particular bear on the outer face 110a of the outer skin 110, as is represented by way of example in FIGS. 1 and 2. Optionally a feed-through 6 which extends as an opening between the outer face 110a and the inner face 110b is furthermore provided. This feed-through 6 is used to receive electrical lines W, which may for example be connected to the connection interface 5 of the aerial device 1.

Figure 5:
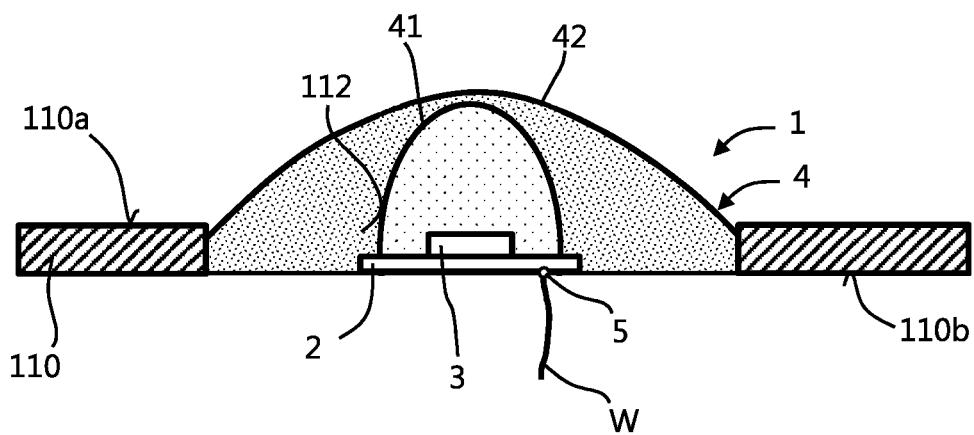
FIG. 5 shows a schematic sectional view of an aerial device according to a further example embodiment of the disclosure herein.

FIG. 5 represents a further possible arrangement of the aerial device 1 on the outer skin 110. As in FIG. 5, the outer skin 110 may comprise a two-dimensional reception recess 112 which extends between the outer face 110a and the inner face 110b. The inner circumference of this reception recess 112 may be configured so as to correspond substantially to an outer face of the second lens region 42. As schematically represented in FIG. 5, the aerial device 1 is positioned, or arranged, relative to the reception recess 112 in such a way that the second lens region 42 of the lens 4 is arranged in the reception recess 112 of the outer skin 110. In particular, the second lens region 42 may fully cover or close the reception recess 112. FIG. 5 represents purely by way of example that the carrier plate 2 is arranged approximately flush with the inner face 110b of the outer skin 110. In principle the carrier plate 2, or in general the aerial arrangement 3, may also be arranged on the inner side of the outer skin 110, defined by the inner face 110b.

Although the disclosure herein has been explained by way of example above with the aid of example embodiments, it is not restricted thereto but may be modified in a variety of ways. In particular combinations of the example embodiments above may also be envisioned.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCES 1 aerial device
2 carrier plate
2a first surface of the carrier plate
3 aerial arrangement
4 lens
4a surface of the lens
5 connection interface
6 feed-through
30 semiconductor device
41 first lens region
42 second lens region
42A base circumference of the second lens region
43a upper surface
43b lateral surfaces
44A front end of the second lens region
44B rear end of the second lens region
50 radar transceiver
100 vehicle
101 aircraft
102 fuselage
110a outer face
110b inner face
112 reception recess
C1 transverse direction
L1 longitudinal direction
L100 fuselage longitudinal axis
H1 height direction
h42 height of the second lens region

The invention claimed is:

1. An aerial device for a vehicle or an aircraft, the aerial device comprising: an aerial arrangement; and a lens which comprises: a first lens region that covers the aerial arrangement and comprises a first material, the first material having a first dielectric constant; and a second lens region that covers the first lens region and comprises a second material, the second material having a second dielectric constant; wherein the second dielectric constant is lower than the first dielectric constant; wherein the second lens region extends in a shape of an arc in a longitudinal direction and in relation to a height direction directed transversely with respect to the longitudinal direction; wherein the first lens region is configured to focus electromagnetic radiation emitted from the aerial arrangement; wherein the first dielectric constant is in a range of between 9 and 12; and wherein the second dielectric constant is in a range of between 2.1 and 3.

2. The aerial device of claim 1, wherein the second material is a plastic material.

3. The aerial device of claim 1, wherein the first lens region and the second lens region are formed as one piece.

4. The aerial device of claim 1, wherein the first lens region is adhesively bonded to the second lens region.

5. The aerial device of claim 1, wherein the aerial arrangement is integrated on a semiconductor device, which is fastened on a carrier plate.

6. The aerial device of claim 5, wherein a radar transceiver circuit is integrated onto the semiconductor device.

7. The aerial device of claim 1, comprising an electrical connection interface.

8. The aerial device of claim 1, wherein the aerial arrangement is configured for operation at frequencies in a range of between 60 GHz and 300 GHz.

9. A vehicle comprising:
an outer skin with an outer face which forms a flow surface; and
the aerial device of claim 1, which is connected to the outer skin, wherein the second lens region of the lens protrudes beyond the outer skin.

10. The vehicle of claim 9, wherein the aerial device is on the outer face.

11. The vehicle of claim 9, wherein:
the outer skin comprises a reception recess which extends between the outer face and an opposite inner face; and the second lens region of the lens is in the reception recess of the outer skin.

12. The vehicle of claim 9, wherein the vehicle is an aircraft.

13. The aerial device of claim 1, wherein the first material is a plastic material, silicon, or aluminum nitride.

14. The aerial device of claim 13, wherein the second material is a plastic material.

15. The aerial device of claim 5, wherein the carrier plate is a circuit board.

16. The aerial device of claim 15, wherein the carrier plate is formed from an electrically insulating plastic material.

17. The aerial device of claim 16, wherein the first material is a plastic material, silicon, or aluminum nitride.

18. The aerial device of claim 17, wherein the second material is a plastic material.

19. The aerial device of claim 18, wherein a radar transceiver circuit is integrated onto the semiconductor device.

20. The aerial device of claim 18, wherein: the aerial arrangement is provided directly on the circuit board and is electrically connected to a semiconductor chip of the semiconductor device; and wherein the semiconductor chip contains one or more radar transceiver circuits.

* * * * *